(12) United States Patent
Lim et al.

(10) Patent No.: US 9,942,857 B2
(45) Date of Patent: Apr. 10, 2018

(54) METHOD FOR TRANSMITTING AND RECEIVING INTERFERENCE CONTROL SIGNALS BASED ON POWER INFORMATION, AND APPARATUS THEREFOR

(71) Applicant: LG ELECTRONICS INC., Seoul (KR)

(72) Inventors: Dongguk Lim, Seoul (KR); Jinyoung Chun, Seoul (KR); Wookbong Lee, Seoul (KR); Jinsoo Choi, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/034,855

(22) PCT Filed: Nov. 21, 2014

(86) PCT No.: PCT/KR2014/011254
§ 371 (c)(1),
(2) Date: May 5, 2016

(87) PCT Pub. No.: WO2015/088160
PCT Pub. Date: Jun. 18, 2015

(65) Prior Publication Data
US 2016/0286499 A1 Sep. 29, 2016

Related U.S. Application Data

(60) Provisional application No. 61/914,970, filed on Dec. 12, 2013.

(51) Int. Cl.
*H04W 52/24* (2009.01)
*H04W 52/22* (2009.01)
*H04W 84/12* (2009.01)

(52) U.S. Cl.
CPC ....... *H04W 52/228* (2013.01); *H04W 52/243* (2013.01); *H04W 52/242* (2013.01); *H04W 84/12* (2013.01)

(58) Field of Classification Search
CPC . H04W 52/22; H04W 52/223; H04W 52/225; H04W 52/228; H04W 52/24
See application file for complete search history.

(56) References Cited

U.S. PATENT DOCUMENTS

| | | | |
|---|---|---|---|
| 2003/0036404 A1* | 2/2003 | Adachi | H01Q 1/246 455/522 |
| 2005/0143119 A1* | 6/2005 | Chandra | H04W 52/288 455/522 |
| 2015/0181546 A1* | 6/2015 | Freda | H04W 56/0015 370/336 |

FOREIGN PATENT DOCUMENTS

| | | |
|---|---|---|
| JP | 2008-079197 | 4/2008 |
| KR | 10-2016-0101555 | 9/2006 |

(Continued)

OTHER PUBLICATIONS

PCT International Application No. PCT/KR2014/011254, Written Opinion of the International Searching Authority dated Feb. 3, 2015, 18 pages.

*Primary Examiner* — Wesley Kim
*Assistant Examiner* — Dong-Chang Shiue
(74) *Attorney, Agent, or Firm* — Lee Hong Degerman Kang Waimey

(57) ABSTRACT

The present document relates to a method for transmitting and receiving signals by controlling interference on other wireless devices based on actual transmitted power or received power information in a wireless communication system, and an apparatus therefor. To this end, STA 1 receives from STA 2 a frame comprising power information about actual transmitted power or actual received power of (Continued)

STA 2. Through the frame, STA 1 determines transmitted power by correcting the existing transmitted power of STA 1 by using the power information of STA 2 and, when the determined transmitted power of STA 1 is less than or equal to a reference value, transmits signals through the frame.

11 Claims, 8 Drawing Sheets

(56) References Cited

FOREIGN PATENT DOCUMENTS

| KR | 10-2008-0018266 | 2/2008 |
| KR | 10-2009-0071567 | 7/2009 |

* cited by examiner

METHOD FOR TRANSMITTING AND RECEIVING INTERFERENCE CONTROL SIGNALS BASED ON POWER INFORMATION, AND APPARATUS THEREFOR

CROSS-REFERENCE TO RELATED APPLICATIONS

This application is the National Stage filing under 35 U.S.C. 371 of International Application No. PCT/KR2014/011254, filed on Nov. 21, 2014, which claims the benefit of U.S. Provisional Application No. 61/914,970, filed on Dec. 12, 2013, the contents of which are all hereby incorporated by reference herein in their entirety.

TECHNICAL FIELD

The following description relates to a method of transmitting and receiving signals by controlling interference caused to other wireless devices based on an actual transmission power or reception power information in a wireless communication system and apparatus therefor.

BACKGROUND ART

In all wireless communications, a variety of demands for interference control are present. However, in this document, a wireless local area network (WLAN) system is mainly described as an example of the system to which the present invention can be applied.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11 ac that uses a bandwidth of up to 160 MHz and supports a transmission rate of up to 1 Gbits/s for 8 spatial streams and IEEE 802.11 ax standards are under discussion.

Since communication in IEEE 802.11 is performed through a shared wireless medium, it has characteristics fundamentally different from those of a wired channel environment. For instance, in a wired communication environment, communication was made possible based on CSMA/CD (carrier sense multiple access/collision detection). In particular, if a signal is transmitted once from a transmitting end, the signal may be transmitted to a receiving end without significant signal attenuation since there is almost no change in a channel environment. In this case, if two or more signals collide with each other, reception power detected by the receiving end becomes temporarily greater than power transmitted by the transmitting end. Thus, whether the collision occurs may be detected through the instantly increased reception power.

However, in a wireless channel environment, since various elements (e.g., depending on a distance, signal attenuation may be increased or be deep-faded instantly) affect a channel, a transmitting end cannot precisely perform carrier sensing regarding whether a signal has been properly received by a receiving end or whether a collision between signals has occurred.

DISCLOSURE

Technical Problem

In the above-described wireless communication, a technique for transmitting and receiving signals by efficiently controlling interference between devices is required.

Technical Solution

To achieve the aforementioned objective, in one technical aspect of the present invention, provided herein is a method of transmitting a signal by a first station in a wireless communication system, including the steps of receiving a frame containing power information on either an actual transmission power of a second station or an actual reception power of the second station from the second station, determining a transmission power of the first station by correcting a previous transmission power of the first station using the power information of the second station, and if the determined transmission power of the first station is equal to or lower than a predetermined reference value, transmitting the signal with the determined transmission power of the first station.

In another technical aspect of the present invention, provided herein is a station apparatus operating as a first station, including a transceiver configured to receive a frame containing power information on either an actual transmission power of a second station or an actual reception power of the second station from the second station and a processor connected to the transceiver, the processor determining a transmission power of the first station by correcting a previous transmission power of the first station using the power information of the second station received though the transceiver, the processor, if the determined transmission power of the first station is equal to or lower than a predetermined reference value, controlling the transceiver to transmit the signal with the determined transmission power of the first station.

The power information of the second station may correspond to the actual transmission power of the second station and in this case the correction of the previous transmission power of the first station may be performed in a manner of either adding a difference between the actual transmission power of the second station and the previous transmission power of the first station to the previous transmission power of the first station or subtracting the difference between the actual transmission power of the second station and the previous transmission power of the first station from the previous transmission power of the first station.

In addition, the predetermined reference value may be set to a value obtained by multiplying the previous transmission power of the first station by a pathloss value and the pathloss value may be calculated through a ratio of a reception power of a signal transmitted from the second station to the actual transmission power of the second station.

Alternatively, the predetermined reference value may be set to a CCA (clear channel assessment) reference value.

On the other hand, the power information of the second station may correspond to the actual reception power of a signal received by the second station and in this case the previous transmission power of the first station may be corrected through a pathloss value calculated based on the actual reception power information of the second station.

In this case, the predetermined reference value may be set to a CCA (clear channel assessment) reference value.

The frame containing the power information of the second station may correspond to either an RTS (request to send) frame or a CTS (clear to send) frame. Alternatively, the power information of the second station may be received in a state of being included in a PLCP header of the frame.

Advantageous Effects

According to the present invention described above, interference control can be performed based on actual transmission power of a different station. Accordingly, a station can transmit and receive signals in a manner of sharing a medium occupied by the different station efficiently.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method of transmitting and receiving signals by controlling interference caused to other wireless devices based on an actual transmission power or reception power information in a wireless communication system and apparatus therefor. To this end, details of a WLAN system to which the present invention can be applied are explained.

Figure 1:
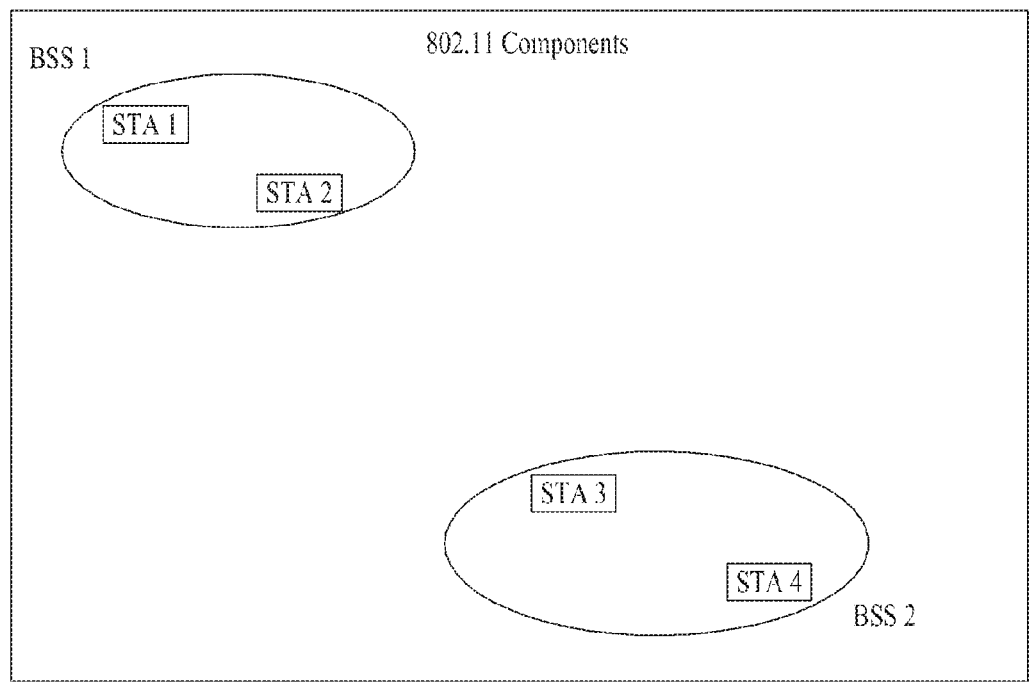
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
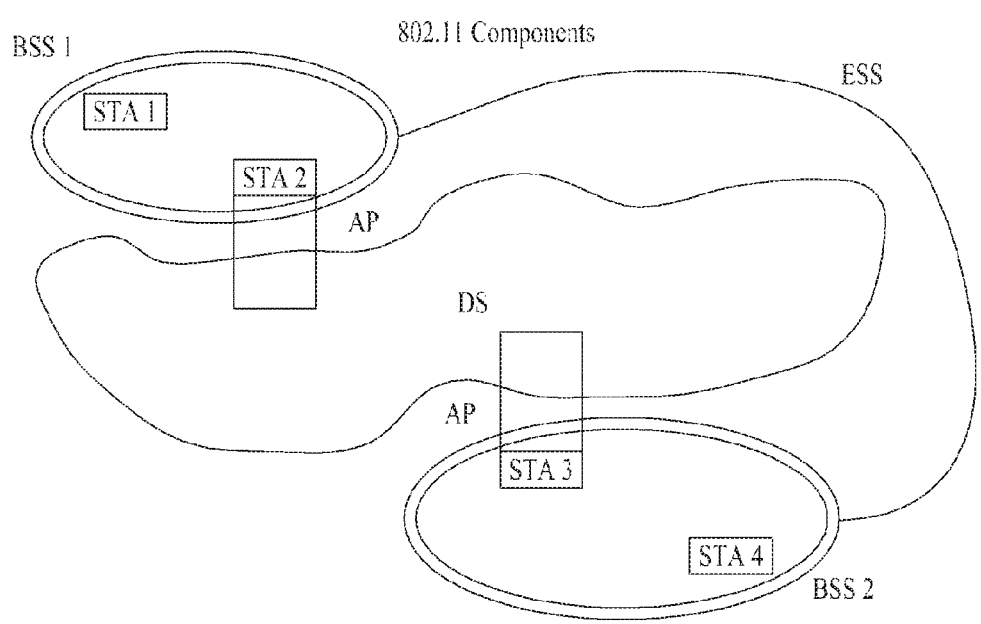
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a collision detection technology of the WLAN system according to the present invention is explained hereinafter.

As mentioned in the foregoing description, a transmitting end has a difficulty in performing accurate collision detection in a wireless environment since various elements affect a channel in the wireless environment. In order to solve the problem, a DCF (distributed coordination function), which corresponds to a CSMA/CA (carrier sense multiple access/collision avoidance) mechanism, has been introduced in 802.11.

Figure 3:
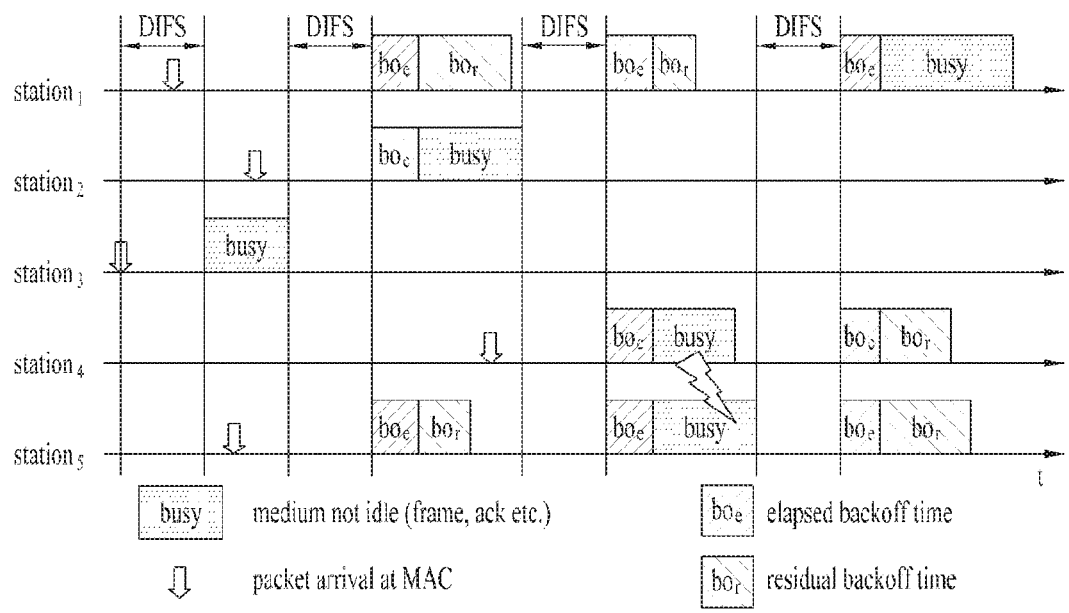
FIG. 3 is a diagram for describing a DCF mechanism in a WLAN system.

FIG. 3 is a diagram for describing the DCF mechanism in the WLAN system.

The DCF performs CCA (clear channel assessment) for sensing a medium during a specific period (e.g., DCF inter-frame space (DIFS)) before STAs having data to be transmitted transmit the data. In this case, if the medium is idle, an STA may transmit a signal using the idle medium. On the contrary, if the medium is busy, an STA may transfer data after waiting for a random backoff period in addition to the DIFS on the assumption that several STAs stand by in order to use the busy medium. In this case, the random backoff period allows STAs to avoid collisions with each other. In particular, assuming that there are a plurality of STAs that intend to transmit data, each of the STAs may have a different backoff period value stochastically. Accordingly, each of the STAs may have a different transmission time. If an STA initiates transmission using a medium, other STAs may not use the medium.

In the following description, a random backoff time and a random backoff procedure are briefly explained.

If a specific medium is switched from a busy state to an idle state, a plurality of STAs start preparations for transferring data. In this case, in order to minimize collisions, each of the STAs that intend to transmit data selects a random backoff count and then stands by for a corresponding slot time. The random backoff count is a pseudo-random integer value and is determined as one of values uniformly distributed in the range of [0 CW]. The CW means a contention window.

Although a CW parameter has an initial value CWmin, this value may be doubled in case of transmission failure. For instance, when an STA fails in receiving ACK in response to a transmitted data frame, the STA may consider that a collision occurs. When a CW value reaches a maximum value CWmax, the CWmax value is maintained until data transmission is successfully performed. If the data transmission is successful, the CW value is reset to the CWmin value. In this case, for convenience of implementation and operation, it is preferable that CW, CWmin and CWmax are set to maintain $2^n-1$.

Meanwhile, if a random backoff procedure is initiated, an STA continuously monitors a medium during backoff slot countdown after selecting a random backoff count in the range of [0 CW]. During the countdown, if the medium enters a busy state, the STA stops the countdown and stands by. Thereafter, if the medium enters an idle state, the STA resumes the rest of backoff slot countdown.

Referring to FIG. 3, when there are a plurality of STAs that intend to transfer data, STA 3 transfers data immediately since a medium has been in the idle state for DIFS. However, the rest of STAs stand by until the medium enters the idle state. Since the medium has been in the busy state for a while, several STAs monitors the medium in order to use it and thus each of the STAs selects a random backoff count. FIG. 3 illustrates a case that STA 2, which selects a smallest backoff count, transmits a data frame.

After the STA 2 completes transmission, the medium is in the idle state again and then the STAs resume the stopped countdown with respect to backoff interval. In FIG. 3, having stopped the countdown for a while since the medium was in the busy state, STA 5 having a second smallest backoff count value (smaller than that of the STA 2) starts data frame transmission after performing the remaining backoff slot countdown. However, a collision occurs since it overlaps with a random backoff count value of STA 4 by chance. In this case, since both of the two STAs fail in receiving ACK response, they select random backoff count values again after doubling the CW.

As described above, the most basic of CSMA/CA is the carrier sensing. A terminal may use both physical carrier sensing and virtual carrier sensing in order to determine whether a DCF medium is in a busy state or an idle state. The physical carrier sensing is performed through energy detection or preamble detection in a physical layer (PHY). For instance, if a voltage level in a receiving end is measured or if it is determined that a preamble is read, the terminal may determine that the medium is in the busy state. The purpose of the virtual carrier sensing is to prohibit other STAs from transmitting data by configuring NAV (network allocation vector) and it is performed using a value of Duration field in a MAC header. Moreover, a robust collision detect mechanism has been introduced in order to reduce collision probability. The reason for the introduction can be checked through the following two examples. For convenience, the range of carrier sensing is assumed to be equal to that of transmission.

Figure 4:
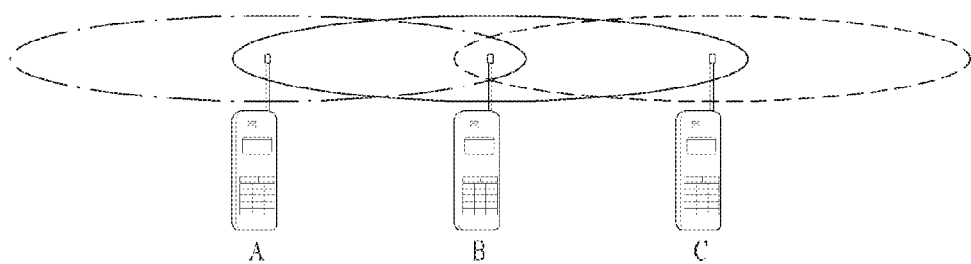
FIGS. 4 and 5 are diagrams for describing problems of the conventional collision resolution mechanism.
Figure 5:
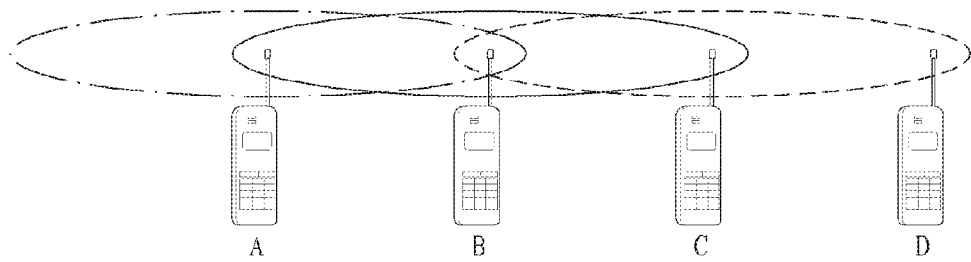

FIGS. 4 and 5 are diagrams for describing problems of the conventional collision resolution mechanism.

Specifically, FIG. 4 is a diagram for explaining hidden node issues. In the present example, STA A and STA B communicate with each other and STA C has information to be transmitted. In particular, although the STA A transmits information to the STA B, while performing the carrier sensing on a medium before transmitting data to the STA B, the STA C cannot detect signal transmission from the STA A since the STA C is out of transmission range of the STA A. As a result, the STA C may determine that the medium is in the idle state. In this case, the STA B simultaneously receives information form both of the STA A and STA C and thus a collision occurs. Here, the STA A can be regarded as a hidden node of the STA C.

On the other hand, FIG. 5 is a diagram for explaining exposed node issues. In FIG. 5, STA B transmits data to STA A. In this case, STA C performs the carrier sensing and then determine that a medium is in the busy state due to information transmitted from the STA B. As a result, even if the STA C intends to transmit data to STA D, since the medium is sensed as busy, the STA C needs to stand by unnecessarily until the medium becomes idle. In other words, even though the STA A is out of the CS range of the STA C, the STA A may prevent the STA C from transmitting information. Here, the STA C can be regarded as an exposed node of the STA B.

To efficiently use a collision avoidance mechanism in the above-mentioned situations, a short signaling packet such as RTS (request to send), CTS (clear to send) or the like can be introduced. According to the short signaling packet, neighboring STAs may overhear whether information is transmitted between two STAs. In other words, if an STA that intends to transmit data transmits an RTS frame to an STA that will receive the data, the receiving STA can notify neighboring STAs that it will receive the data in a manner of transmitting a CRS frame to the neighboring STAs.

Figure 6:
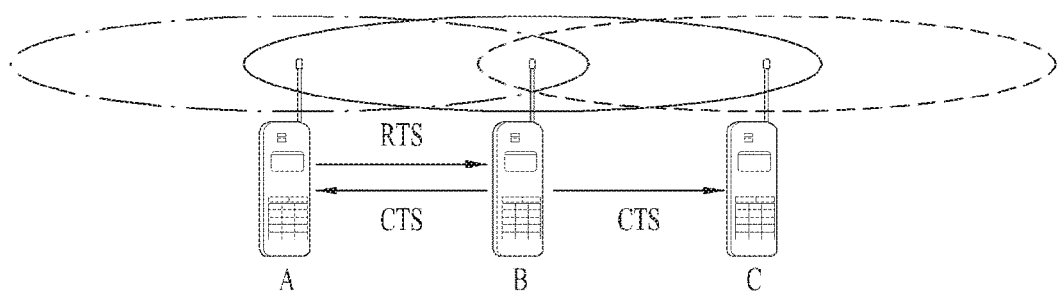
FIG. 6 is a diagram to describe a mechanism for solving hidden node issues using RTS/CTS frame.

FIG. 6 is a diagram to describe a mechanism for solving hidden node issues using RTS/CTS frame.

Referring to FIG. 6, both STA A and STA C intend to transmit data to STA B. If the STA A transmits RTS to the STA B, the STA B transmits CTS to both of the STA A and STA C located adjacent to the STA B. Consequently, the STA C stands by until both of the STA A and STA B complete data transmission and thus a collision can be avoided.

Figure 7:
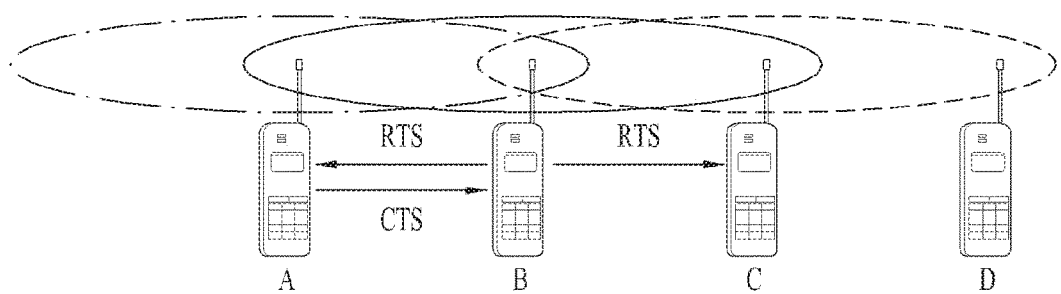
FIG. 7 is a diagram to describe a mechanism for solving exposed node issues using RTS/CTS frame.

FIG. 7 is a diagram to describe a mechanism for solving exposed node issues using RTS/CTS frame.

Referring to FIG. 7, by overhearing RTS/CTS transmission between STA A and STA B, STA C may know that a collision does not occur even if the STA C transmits data to STA D. In particular, the STA B transmits RTS to all neighboring STAs but transmits CTS only to the STA A to which the STA B will actually transmit data. Since the STA C receives RTS except CTS from the STA A, the STA C can recognize that the STA A is out of the CS range of the STA C.

Figure 8:
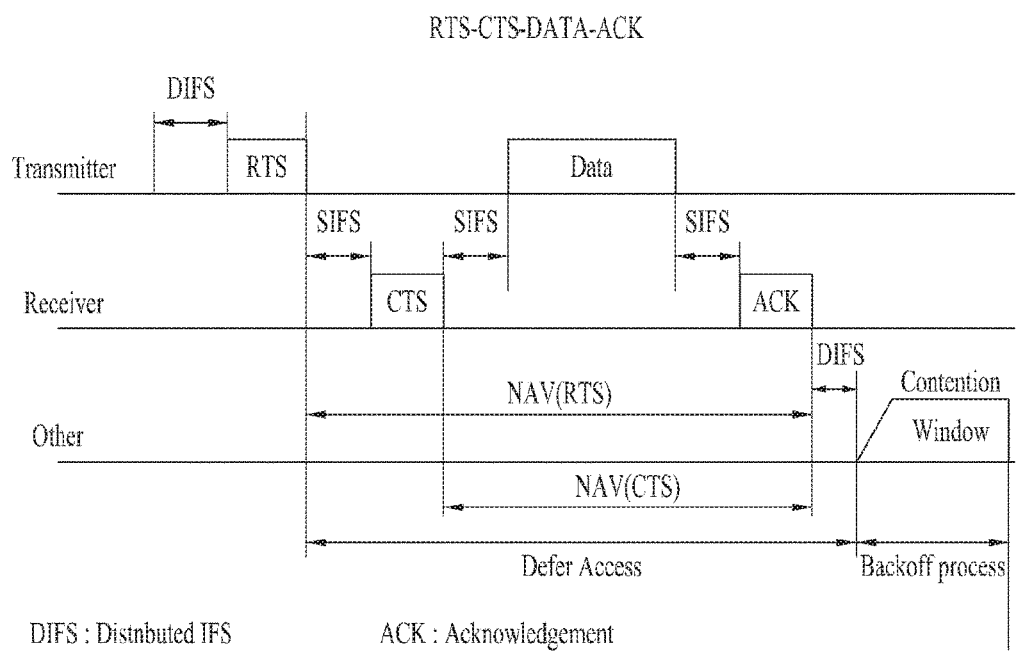
FIG. 8 is a diagram for describing details of an operating method using RTS/CTS frame.

FIG. 8 is a diagram for describing details of an operating method using RTS/CTS frame.

Referring to FIG. 8, after DIFS (distributed IFS), a transmitting STA may transmit an RTS frame to a receiving STA to which the transmitting STA will transmit a signal. Having received the RTS frame, the receiving STA may transmit CTS to the transmitting STA after SIFS (short IFS). After receiving CTS from the receiving STA, the transmitting STA may transmit data after SIFS as shown in FIG. 8. After receiving the data, the receiving STA may transmit ACK response in response to the data received after SIFS.

Meanwhile, among neighboring STAs except the above-mentioned transmitting and receiving STAs, an STA that receives RTS/CTS of the transmitting STA may determine whether a medium is busy or not according to RTS/CTS reception as described above with reference to FIGS. 6 and 7. And, the STA may configure NAV (network allocation vector) based on the medium state. If NAV duration ends, the STA may perform the contention resolution procedure described above with reference to FIG. 3 after DIFS.

As mentioned in the foregoing description, an 802.11 device determines whether to transmit a signal through a corresponding channel by grasping a state (e.g., clear or occupied state) of the corresponding channel based on CCA rule. For instance, in 802.11ac, a device uses CCA thresholds for a primary channel and a secondary channel. When the strength of a signal received through a channel is not greater than the CCA thresholds, the device recognizes that the channel is clear and then transmits a signal through the corresponding channel. In 802.11ac, the CCA threshold for the primary channel is set to −82 dbm and the CCA threshold for the secondary channel is set to −62 dbm. In the above case, the strength of the transmitted signal may be determined by applying $\Delta P$ (e.g., a difference value between the received signal strength and the transmitted signal strength) to the strength of the received signal.

For example, in case that $\Delta P$ is 10 dbm, if RSSI (receive signal strength indicator) of a signal received by a device is −90 dbm, it satisfies the CCA threshold. In this case, the device may transmit a signal with a power of −80 dbm by applying $\Delta P$ to a corresponding channel. However, when the 802.11 device transmits a signal using the CCA rule, the following problems may be caused.

Problem 1

Figure 9:
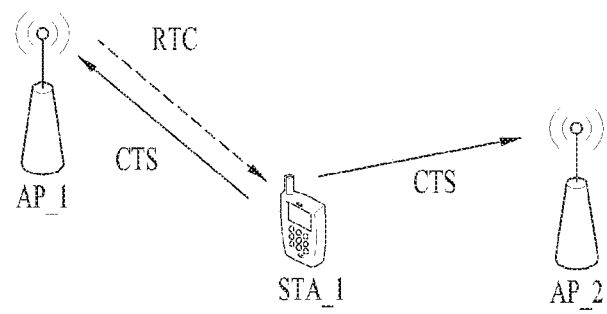
FIGS. 9 to 11 are diagrams for describing problems of the CCA rule having fixed ΔP applied thereto.

FIG. 9 is a diagram for describing a problem of the CCA rule having fixed $\Delta P$ applied thereto.

As shown in FIG. 9, assume a case that STA_1 exists between AP1 and AP2 and the STA_1 is associated with the AP1. To transmit a packet to the STA_1 located within BSS, the AP1 may transmit RTS (request to send) as described above. Having received the RTS transmitted by the AP1, the STA_1 may transmit CTS corresponding to a response message for the RTS to the AP1. In this case, assume that the AP2 detects the CTS frame transmitted from the STA_1 but fails in configuring NAV (network allocation vector). Thus, the AP2 in neighboring BSS performs CCA for a channel by estimating RSSI with respect to the CTS transmitted by the STA_1. If the strength of the received signal is −90 dbm, since the RSSI is lower than the CCA threshold, the AP2 determines that the channel is clear and then perform packet transmission. In this case, since a power of the transmitted packet is −80 dbm, the STA_1 receives the transmitted signal with a power higher than the CCA threshold, whereby it may cause interference to signal transmission between the STA_1 and AP1.

Problem 2

Figure 10:
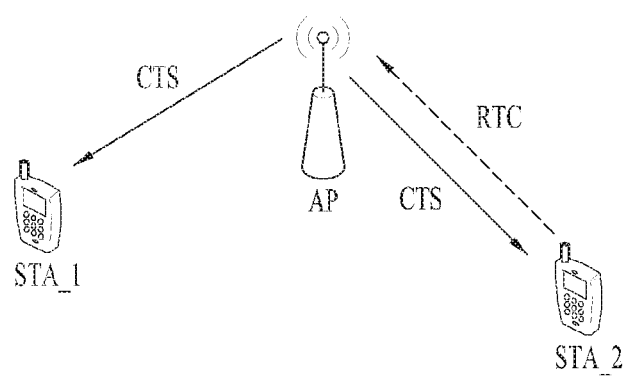

FIG. 10 is a diagram for describing another problem of the CCA rule having fixed $\Delta P$ applied thereto.

Referring to FIG. 10, AP may receive an RTS (request to send) frame for packet transmission from STA 2 within BSS. In this case, if received signal strength (RSSI) of the RTS frame, which is received by the AP from the STA_2, is −90 dbm, the AP transmits a response message through a CTS frame. In this case, the AP transmits the CTS (clear to send) frame to the STA_2 with a power of −80 dbm in a manner of applying $\Delta P$ (10 dbm). Since the transmission power of the CTS frame transmitted by the AP is −80 dbm higher than the CCA threshold, neighboring STA_1, which performs CCA for packet transmission, does not perform the packet transmission according to the CCA rule. However, if considering a location of the STA_1, the strength of the received RTS signal and the like, the packet transmission in the STA_1 may not affect packet reception in the STA 2/packet transmission in the AP. Thus, it has a problem of reduced resource efficiency in that available resources are not utilized.

Problem 3

Figure 11:
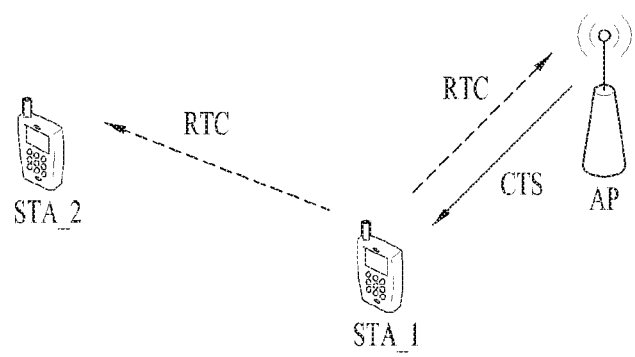

FIG. 11 is a diagram for describing another problem of the CCA rule having fixed $\Delta P$ applied thereto.

Even if STA/AP receives RTS but fails in receiving CTS, it may cause the following problem. For instance, as shown in FIG. 11, STA_1 may transmit an RTS frame to AP for packet transmission. In this case, RSSI of the RTS frame is −90 dbm and AP may transmit a CTS frame to the STA_1 with a power of −80 dbm by applying $\Delta P$ (10 dbm). However, STA_2 receives only the RTS frame transmitted by the STA_1 but cannot receive the CTS frame transmitted by the AP. In addition, since the RSSI of the RTS frame received by the STA_2 is −90 dbm lower than the CCA threshold, the STA_2 recognizes the channel, which is used by the AP and STA_1 to transceive signals with each other, as a clear channel and thus may initiate packet transmission using the channel. In this case, the STA_2 may also transmit the packet with the power of −80 dbm by applying the $\Delta P$ (10 dbm). Thus, it has a problem in that the signal transmitted by the STA_2 affects transmission and reception between the AP and STA_1 by acting as interference higher than the CCA threshold.

According to one preferred embodiment of the present invention, in order to solve the above-mentioned problems, actual power information (e.g., power level, power class, discrete power, reception power (RSSI), etc.) of STA/AP may be transmitted by being included in a management frame such as CTS/RTS or a PLCP header. And, a method for another AP/STA to transceive signals using the above information is proposed. In other words, according to the present embodiment, power information of STA/AP (e.g., laptop, smartphone, tablet, etc.) with various capabilities may be included in the PCLP header. And, the power information may be transmitted whenever a data frame is transmitted by the STA/AP with various capabilities. Alternatively, before transmission of the data frame, the power information may be transmitted through the control or management frame such as RTS/CTS, which is transceived through connection between STAs/APs with various capabilities.

Figure 12:
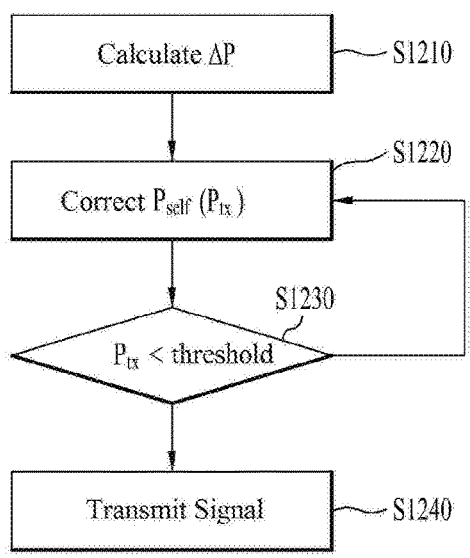
FIG. 12 is a diagram for describing a method of performing transmission power control by calculating ΔP using power information according to a preferred embodiment of the present invention.

FIG. 12 is a diagram for describing a method of performing transmission power control by calculating ΔP using power information according to a preferred embodiment of the present invention.

First of all, STA/AP 1 may receive a frame including power information on actual transmission power or actual reception power of STA/AP 2 from the STA/AP 2. That is, instead of applying the fixed ΔP as described above, the STA/AP 1 may configure ΔP based on the actual power information of the STA/AP 2 [S1210]. Moreover, the STA/AP 1 may correct its own transmission power (Ptx) using the ΔP configured based on the power information of the STA/AP 2 as described above [S1220]. If the determined transmission power is equal to or lower than a predetermined reference value, the STA/AP 1 may transmit a signal with the determined transmission power [S1240]. On the contrary, if the determined transmission power is equal to or higher than the predetermined reference value, the STA/AP 1 may reconfigure the transmission power by correcting the transmission power again [S1220].

As a specific example, the power information of the STA/AP 2 may correspond to transmission power information of the STA/AP 2.

In this specific example, the STA/AP 1 may calculate power difference ($\Delta P = P_{other} - P_{self}$) using its transmission power ($P_{self}$) and transmission power (P_other) of the STA/AP 2 with various capabilities, which is obtained from the received frame (e.g., data frame, control frame, management frame, etc.) [S1210]. Using the ΔP obtained from its transmission power information and the power information of the different STA/AP 2, which has been transmitted the signal, the STA/AP 1 may determine presence or non-presence of interference on the STA/AP 2 that performs transmission and reception by occupying the current channel. Alternatively, the presence or non-presence of interference on the STA/AP 2 that occupies the channel may be determined according to whether the CCA rule is met.

Particularly, the STA/AP 1 determines transmission power using the calculated ΔP [S1220]. For instance, the transmission power may be determined according to the equation, $Ptx = P_{self} - \Delta P$ or $P_{self} + \Delta P$. In this case, if the transmission power is lower than a threshold [S1230], the STA/AP 1 may transmit a signal through the occupied channel by determining that interference has no effect [S1240]. The threshold used for determining the presence or non-presence of interference can be defined as $P_{self} \times$ Pathloss where the pathloss is defined as Pathloss= $RSSI_{STA\ or\ AP}/P_{other}$.

However, the above-mentioned example is merely one example. In other words, the CCA threshold may be used as it is or the threshold may be created in a different manner such that it is received from BSS AP or from different BSS AP/STA. If the STA/AP 1 determines that it does not affect the different STA/AP 2 after checking the presence or non-presence of interference, i.e., if the transmission power is lower than the threshold, the STA/AP 1 may initiate packet transmission through the corresponding channel [S1240]. In this case, the STA/AP 1 may modify and use the CCA rule/threshold in order to perform the transmission through the corresponding channel.

According to the above-described method, interference control may be performed through ΔP and power control of STA/AP. In this case, the STA/AP adjusts transmission power of the corresponding STA/AP using ΔP in order to satisfy the transmission power according to the CCA rule. When the STA/AP can transmit a signal with transmission power (i.e., when the transmission power is lower than the threshold) that may not cause interference to AP/STA 2, which transmits and receives signals by occupying the current channel, the STA/AP may transceive packets using the corresponding channel.

The STA/AP 1 that transmits the packet through the channel occupied by the different STA/AP 2 according to the above-mentioned method may transceive packets only within TXOP of the STA/AP 2, which currently occupies the corresponding channel, using the same method. The TXOP for the occupied channel may be grasped through a beacon frame or TIM. In addition, AP and STA may transmit signals through the channel occupied by the different STA/AP 2 using different CCA levels or thresholds according to the same method.

As another example of the present embodiment, reception power can be utilized as the above-mentioned actual power information. In particular, signal receiving STA/AP 1 may include received signal strength (RSSI) obtained from a data frame or a control/management frame such as CTS/RTS frame, which has been transmitted from AP/STA 2 with various capabilities, in a control/management frame such as RTS/CTS frame or a PCLP header and then transmit the received signal strength (RSSI). In this case, RSSI information may be transmitted whenever a data frame is transmitted or be transmitted through the control/management frame transceived before data transfer. Based on RSSI transmitted from different STA/AP 2, the STA/AP 1 may be aware of a channel state between the STA 2 and AP 2 that transceiver signals through the corresponding channel. Moreover, the STA/AP 1 may consider the effects of interference on the STA/AP 2, which occupies the corresponding channel, using information on the transmission power of the STA/AP 2 obtained from the data frame or the control/management frame and the received RSSI information. If determining that there is no effect of interference, the STA/AP 1 may perform packet transmission using the corresponding channel. In this case, presence or non-presence of interference with respect to transmission in the STA/AP 2 can be determined based on the following information.

CCA threshold

RSSI value received from different AP/STA 2

Received RSSI value±ΔP

Regarding the threshold, if $P_{self} \times$ Pathloss calculated based on the power information transmitted from the different AP/STA 2 is lower than the above-mentioned values, the STA/AP 1 may transmit the packet through the corresponding channel since the effects of interference is small. In this case, the STA/AP 1 may transceive the packets only within TXOP of the STA/AP 2 that occupies the corresponding channel as described above and information on the TXOP may be obtained from a beacon frame or TIM.

Figure 13:
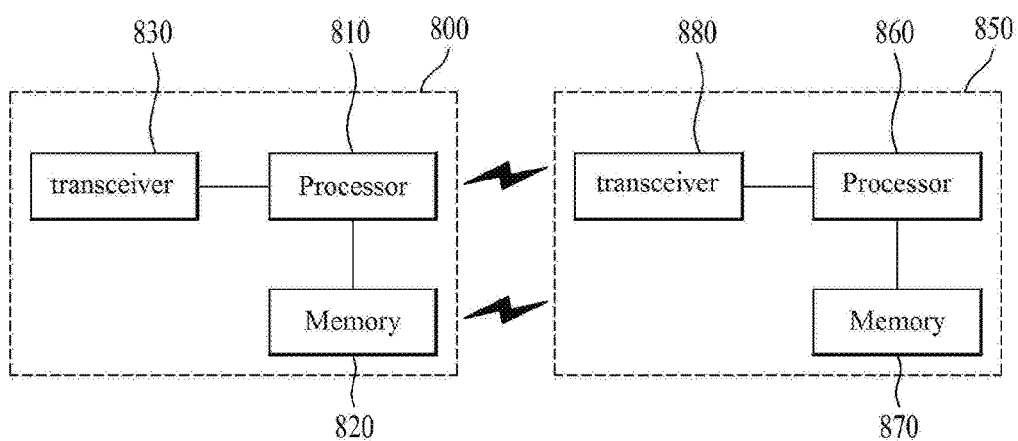
FIG. 13 is a diagram to describe an apparatus for implementing an interference control method according to the present invention.

FIG. 13 is a diagram for explaining an apparatus for implementing the above-described method.

A wireless device 800 and a wireless device 850 in FIG. 13 may correspond to the aforementioned STA/AP 1 and STA/AP 2, respectively.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the present invention is described on the assumption that it will be applied to the WLAN system based on IEEE 802.11, the invention is not necessarily limited thereto. The present invention can be applied to various wireless systems including device-to-device communication and the like in which interference control between wireless devices is required in the same manner.

The invention claimed is:

1. A method of transmitting a signal by a first station in a wireless communication system, the method comprising:
   receiving a frame comprising power information on either an actual transmission power of a second station or an actual reception power of the second station from the second station;
   determining a transmission power of the first station by correcting a previous transmission power of the first station using the power information of the second station; and
   if the determined transmission power of the first station is equal to or lower than a predetermined reference value, transmitting the signal with the determined transmission power of the first station,
   wherein, when the power information of the second station comprises the actual reception power of a signal received by the second station, the previous transmission power of the first station is corrected through a pathloss value calculated based on the actual reception power information of the second station.

2. The method of claim 1, wherein, when the power information of the second station comprises the actual transmission power of the second station,
   the correction of the previous transmission power of the first station is performed in a manner of either adding a difference between the actual transmission power of the second station and the previous transmission power of the first station to the previous transmission power of the first station or subtracting the difference between the actual transmission power of the second station and the previous transmission power of the first station from the previous transmission power of the first station.

3. The method of claim 2, wherein the predetermined reference value is set to a value obtained by multiplying the previous transmission power of the first station by a pathloss value and wherein the pathloss value is calculated through a ratio of a reception power of a signal transmitted from the second station to the actual transmission power of the second station.

4. The method of claim 1, wherein the predetermined reference value is set to a CCA (clear channel assessment) reference value.

5. The method of claim 1, wherein the frame comprising the power information of the second station corresponds to either an RTS (request to send) frame or a CTS (clear to send) frame.

6. The method of claim 1, wherein the power information of the second station is received in a state of being included in a PLCP header of the frame.

7. A station apparatus operating as a first station in a wireless communication system, the station apparatus comprising:
   a transceiver configured to receive a frame comprising power information on either an actual transmission power of a second station or an actual reception power of the second station from the second station;
   a processor connected to the transceiver, the processor determining a transmission power of the first station by correcting a previous transmission power of the first station using the power information of the second station received through the transceiver, the processor, if the determined transmission power of the first station is equal to or lower than a predetermined reference value, controlling the transceiver to transmit the signal with the determined transmission power of the first station,
   wherein, when the power information of the second station comprises the actual reception power of a signal received by the second station, the processor corrects the previous transmission power of the first station through a pathloss value calculated based on the actual reception power information of the second station.

8. The station apparatus of claim 7, wherein, when the power information of the second station comprises the actual transmission power of the second station, the processor corrects the previous transmission power of the first station in a manner of either adding a difference between the actual transmission power of the second station and the previous transmission power of the first station to the previous transmission power of the first station or subtracting the difference between the actual transmission power of the second station and the previous transmission power of the first station from the previous transmission power of the first station.

9. The station apparatus of claim 8, wherein the processor sets the predetermined reference value to a value obtained by multiplying the previous transmission power of the first station by a pathloss value and wherein the pathloss value is calculated through a ratio of a reception power of a signal transmitted from the second station to the actual transmission power of the second station.

10. The station apparatus of claim 7, wherein the processor sets the predetermined reference value to a CCA (clear channel assessment) reference value.

11. The station apparatus of claim 7, wherein the power information of the second station is received through one selected from the group consisting of an RTS (request to send) frame, a CTS (clear to send) frame, and a PLCP header of a frame except the RTS frame and the CTS frame.

* * * * *